(12) United States Patent
Parkvall et al.

(10) Patent No.: US 7,961,752 B2
(45) Date of Patent: Jun. 14, 2011

(54) TRANSMISSION IN A SHARED MEDIUM HAVING DIFFERENT ACCESS MODES

(75) Inventors: Stefan Parkvall, Stockholm (SE); Anders Furuskär, Stockholm (SE); Per Willars, Vaxholm (SE); Reiner Ludwig, Hürtgenwald (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 943 days.

(21) Appl. No.: 11/722,416

(22) PCT Filed: Dec. 22, 2004

(86) PCT No.: PCT/IB2004/052908
§ 371 (c)(1),
(2), (4) Date: Jun. 21, 2007

(87) PCT Pub. No.: WO2006/067556
PCT Pub. Date: Jun. 29, 2006

(65) Prior Publication Data
US 2010/0014423 A1    Jan. 21, 2010

(51) Int. Cl.
*H04L 12/413* (2006.01)
*G01R 31/08* (2006.01)

(52) U.S. Cl. .................. 370/445; 370/235; 370/237

(58) Field of Classification Search .............. 370/235, 370/237, 445
See application file for complete search history.

(56) References Cited

U.S. PATENT DOCUMENTS

| | | | |
|---|---|---|---|
| 7,352,770 B1 * | 4/2008 | Yonge et al. | 370/445 |
| 2004/0131034 A1 * | 7/2004 | Sugaya | 370/337 |
| 2004/0136396 A1 * | 7/2004 | Yonge et al. | 370/445 |
| 2005/0169296 A1 * | 8/2005 | Katar et al. | 370/445 |
| 2005/0193116 A1 * | 9/2005 | Ayyagari et al. | 709/226 |
| 2006/0194575 A1 * | 8/2006 | Stadelmeier et al. | 455/426.1 |

* cited by examiner

*Primary Examiner* — Ricky Ngo
*Assistant Examiner* — Paul Masur
(74) *Attorney, Agent, or Firm* — Roger S. Burleigh (57) ABSTRACT

A method of controlling access in a telecommunication network in which a communication medium, such as a set of frequencies, time slots, or codes, is shared among a plurality of mobile units. Transmissions from the mobile units utilize different access modes, such as a direct access mode and a scheduled access mode. Additionally, the transmissions are divided into different communication types, each having an associated priority. A mode access control unit determines for each priority, which access mode to utilize for the associated communication type. Mobile units having data to transmit access the shared communication medium utilizing the access mode determined for the priority of the communication type to which the data belongs.

17 Claims, 3 Drawing Sheets

Fig. 1

Prior Art

TRANSMISSION IN A SHARED MEDIUM HAVING DIFFERENT ACCESS MODES

FIELD OF INVENTION

The present invention relates to communication, in particular wireless communication in a telecommunication network in which transmission from mobile units can occur over a shared medium having at least two access modes. The invention is particularly related to an arrangement in such a telecommunication network, such as an access point, a node and a mobile unit, and to a method for communication in a telecommunication network.

BACKGROUND

Some wireless telecommunication systems include a Multiple Access Control (MAC) protocol controlling how a plurality of users share a common communication medium, e.g. a set of radio channels such as in FDMA, OFDMA, TDMA, and CDMA. Desired characteristics of such a MAC protocol include
(i) low delays for transmitted data,
(ii) a high aggregate throughput or capacity, and
(iii) service differentiation, so that e.g. high priority services can be guaranteed also for very high traffic loads.
MAC protocols can be divided into
conflict-free, or "scheduled", protocols, and
contention-based, or "direct access" protocols.

Conflict-free protocols ensure that transmissions from other users within a certain set such as a geographic area, e.g. in a cell of a cellular network, do not interfere with transmissions from a considered user. When contention-based protocols are used collisions between transmissions can occur, and principles for resolving such conflicts must be defined. Contention-based protocols allow direct transmission attempts, without previous signaling to ensure that the shared medium is free. This can result in very low delays for transmissions from the users. For high loads however, the risk of collisions between transmission attempts increases, and hence the delay times increase. The collisions also result in that the shared medium is frequently occupied by non-successful transmission attempts, this in turn resulting in a poor aggregate throughput. Service differentiation can be achieved by allowing transmissions of different priorities from the users to access or try to access the shared medium with different probabilities.

Conflict-free protocols involve some signaling before data is transmitted to ensure that the transmission will not be in conflict with other transmissions. Although the duration of this signaling phase may be short, the resulting delay may represent a large fraction of the total transmission time for transmissions from the users, in particular for transmitting small amounts of data. For large amounts of data the duration of the signaling phase is less important. One benefit of conflict-free protocols is that, as opposed to contention-based protocols, a full use of the shared medium can be achieved. This results in a high capacity potential. In the case of a central control node being in charge of the allocation of transmission opportunities, service differentiation can simply be achieved by the central node granting such opportunities based on service type or priority.

Figure 1:
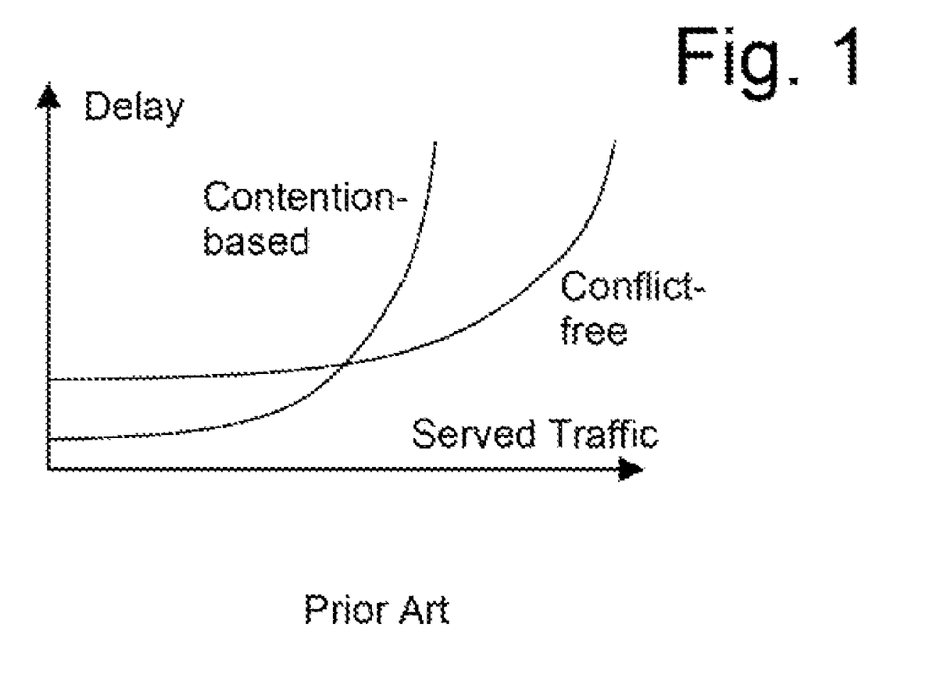
FIG. 1 is a graph showing delay versus served traffic characteristics for contention-based protocols and for conflict-free protocols.

A qualitative comparison of the delay versus served traffic characteristics of the two alternatives is illustrated in the graph of FIG. 1. For low traffic loads the contention-based protocols give lower delays than the conflict-free protocols, whereas for high traffic loads, the conflict-free protocols give lower delays than the contention-based protocols.

In existing wireless network standards, conflict-free MAC protocols with service differentiation are used e.g. for GSM/GPRS and WCDMA, see 3GPP, GSM 04.60, "General Packet Radio Service (GPRS); Mobile Station (MS)—Base Station System (BSS) interface; Radio Link Control/Medium Access Control (RLC/MAC) protocol". A user having data to transmit sends a channel request message to the network, including a priority class, and the base station responds with a resource assignment, pointing to a "reserved" or dedicated resource, including a frequency and time slot or code. This resource will not be used by any other transmission in the cell.

Contention-based protocols are used e.g. by WLANs (Wireless Local Area Networks) built according to the standard IEEE802.11. More specifically, a Carrier Sense Multiple Access (CSMA) protocol is used. Before transmitting, a user first listens to the medium for a certain time to determine that it is not busy. If the medium is busy, or if the transmission from the user fails, the user waits a random backoff time before repeating the process. In the standard IEEE 802.11e, the medium sensing and backoff times are service-class dependent. Contention-based protocols are also used in many cellular systems, e.g., WCDMA, for initiating a call and requesting resources using a random access procedure.

WLANs built according to the standard IEEE 802.11 also have a conflict-free mode. In this mode a central "point coordinator" can take control of the medium and grant transmission opportunities to users in a conflict-free way. The conflict-free and contention-based modes may co-exist, sharing the transmission medium in the time domain. Then, the point coordinator controls the fractions of the medium used by each mode, as well as which users are allowed to transmit in the conflict-free mode. There is no way to control which users that are allowed to use the contention-based mode.

As seen in FIG. 1, the minimum delays are achieved with contention-based MAC protocols in low load traffic situations.

SUMMARY

It is an object of the invention to provide a network, an arrangement for a network and method performed in a network that give an efficient handling of uplink transmission, in particular for transmissions of different priority or service classes.

It is another object of the invention to provide handling of uplink transmission that gives high priority users always short delay times for their uplink transmissions.

A problem that the invention intends to solve is how the minimum delays achieved using contention-based MAC protocols in low load traffic situations can be fully utilized. A specific problem is how to offer these low delays to high priority users in situations with a high total traffic load.

Thus, in a telecommunication network a combined contention-based and conflict-free medium access control using thresholds based on service requirements and load is used. The load thresholds for switching from contention-based to conflict-free mode depend on priority class or service type. By forcing low priority users to the conflict-free mode at low to moderate loads, a low delay on the contention-based resources can be maintained for high-priority also for high traffic loads.

The forcing of low priority users to the conflict-free mode may be soft. This can be accomplished e.g. by gradually limiting the rate at which they may access the contention-based mode.

The network, arrangement and method as described herein provide desired characteristics of a MAC protocol such as low delay, high efficiency, and service differentiation. Lower delays for high priority users at high traffic loads are provided.

Generally, a method of controlling access in a telecommunication network is provided, the telecommunication network typically being a radio or wireless network such as a mobile telephony network or a WLAN. A plurality of mobile units, e.g. mobile telephones, share a communication medium such as for transmitting to a central station, generally called an access point and e.g. being a radio base station. The shared communication medium can be a set of frequencies, time slots or codes etc., and generally some shared set of radio resources. For transmitting from the mobile units in the shared communication medium they can use at least two different access modes, that can include at least a direct access mode and a scheduled access mode. Each of the access modes can in some cases further include a plurality of submodes and then a mobile unit can select one of them for transmission. Finally, at least two communication types are used for transmissions in the shared communication medium from the mobile units. The communication types can e.g. be service classes for special data flows such as voice data, image data, moving image data, etc, such data flows generally requiring different levels of service, and they can also considered as different particular flows of data or flows of different particular data.

The following steps can be performed for controlling the access. First it is assumed that different priorities have in some way been given or assigned to the communication types, such priorities e.g. always including a high priority and a low priority. Also, such assignment of priorities can be assigned dynamically if required. For each of the priorities an access mode is then determined that is to be used for the communication type that has been given the respective priority. Instead of determining only one access mode, a subset of the access modes can be determined. The mobile units then access, in the case where they have data to transmit that belongs to one of the communication types, the communication medium using the access mode or an access mode selected from the access modes included in the subset, that has been determined for the priority given to the communication type to which the data to be transmitted belongs. The determining of one of or a subset of the access modes for each priority can be performed at each instant, at periodically repeated instants, when required or at predetermined events.

The determining of one of or of a subset of the access modes for each priority can be made based on the traffic load such as the total traffic load or the traffic load in the respective one or each one of the access modes. More generally, the current traffic conditions can be determined or estimated, e.g. calculated as an average of traffic conditions during a time period directly before and up to the current instant, in the communication medium. Also generally, the current traffic conditions can be obtained as a value derived from traffic conditions during a time period directly before and up to the current instant. The traffic conditions can typically include the traffic load and e.g. radio conditions and bit error rates. The determining of one of or of a subset of the access modes for each priority is then preferably based on the determined traffic conditions.

Furthermore, the mobile units are advantageously informed on the access mode, or the subset of access modes, which has been determined for each of the different priorities. Such informing can be made by sending suitable control messages to the mobile units. Alternatively or additionally, the mobile units can be informed on the current traffic conditions for example in the shared communication medium, such as by transmitting a control message including some measure of the total traffic load, e.g. the total traffic load for only the shared communication medium.

A first portion of the shared communication medium can be fixedly or dynamically allocated for traffic from the mobile units using a first access mode and a second portion of the communication medium for traffic from the mobile units using a second access mode. More generally, portions, in particular different portions, of the shared communication medium can be allocated to traffic in each one or some of the access modes. Such allocating can be performed at each instant, at periodically repeated instants, when required or at predetermined events. The allocating can as above based on the determined, current traffic conditions.

The steps described above can be performed in or by an access control unit. It can then include an access mode determination unit for making the determination of one or a subset of the access modes for the different priorities. The access control unit can further include an access mode informing unit receiving information from the access mode determining unit for informing the mobile units on the determined ones or subsets of the access modes. Consequently, the access control unit can in turn include an access mode receiving unit, that in some cases can be considered as being included in the access mode determination unit, for receiving information on the access mode or on the subset of the access modes, which is to be used for traffic of the communication types of each of the different priorities.

Furthermore, the access control unit can include a load determining or estimating unit for determining or estimating traffic conditions in the communication medium. The access mode determination unit is then connected to receive information, in particular the result of determining or estimating, from the load determining or estimating unit and makes its determination based on the determined or estimated traffic conditions. The access control unit can include a traffic load informing unit connected to receive information, in particular the determined or estimated traffic conditions, from the load determining or estimating unit for informing the mobile units on the determined or estimated traffic load. As above, the access control unit can then have a load receiving unit for receiving information on the determined or estimated traffic conditions.

The access control unit can also include an access allocation unit for allocating portions of the shared communication medium to traffic from the mobile units using the access modes. The access allocation unit can be connected to receive information from the load determining or estimating unit to make the allocating based on the determined or estimated traffic conditions. As above, an access allocation informing unit can receive information from the access allocation unit for informing the mobile units on the allocating and an access allocation receiving unit can receive information on the allocating.

The access control unit can be located both in the central parts of the telecommunication network and the mobile units, i.e. it can be distributed among the central parts, such as one or more nodes, one or more access points, one or more radio base stations and one or more radio network controllers, and the mobile units. It can be totally located in the central parts except a receiving function or unit that in most cases is required and then is located or performed in the mobile units. It can also be totally located in each of the mobile units.

Thus, a mobile unit for a telecommunication network of kind described above can include a access control unit and particularly an access mode determination unit for determining one or a subset of the access modes that is to be used for the different communication types having priorities. The access mode determination unit can in turn include an access mode receiving unit as described above. It can include a load receiving unit as described above and an access calculation unit connected to the load receiving unit for determining, based on the traffic conditions, an access mode or a subset of the access modes, to be used for traffic of the communication types of each of the different priorities. In another case the access mode determination unit can include a load estimation unit and an access calculation unit connected thereto for determining, based on the estimated traffic conditions, an access mode or a subset of the access modes to be used for traffic of the communication types of each of the different priorities.

In another aspect in which the telecommunication network does not have to include different communication types, it can be determined in the same way as described above, such as by an access control unit or an access allocating unit, at each instant or at least at periodically repeated instants, how much of the shared communication medium is to be used for transmissions in each of the at least two access modes such as for transmissions in the direct access mode and for transmissions in the scheduled mode. As above the determination can be based on determined traffic conditions.

The mode access control unit and the various units included therein or connected thereto can be considered as circuit blocks, each circuit block including electronic circuits specific to the function that the unit performs and/or general electronic circuits shared by a plurality of units or circuit blocks together with one or more memories or a portion or portions of a memory or of memories that are specific to the circuit block and the corresponding unit, the general electronic circuits operating according to information stored in the memory or memories or in said portion or portions thereof.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularity in the appended claims, a complete understanding of the invention, both as to organization and content may be gained from a consideration of the following detailed description of non-limiting embodiments with reference to the accompanying drawings, in which:

DETAILED DESCRIPTION

Figure 2:
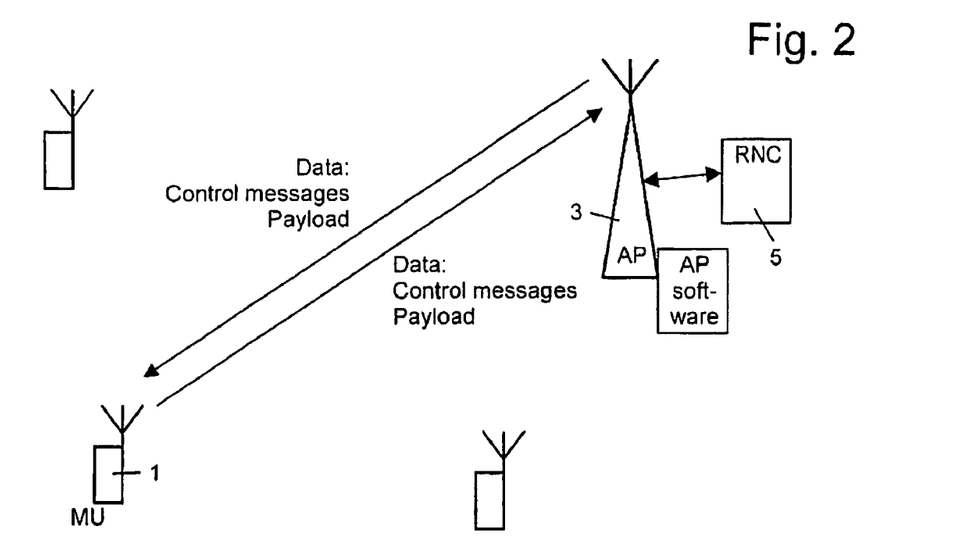
FIG. 2 is a schematic of a general wireless communication network including mobile units and an access point.

In FIG. 2 a general wireless network is illustrated including mobile units 1, also called mobile terminals or user equipments, communicating with a general access point (AP) 3 such as a Radio Base Station (RBS), also simply called a base station, in a mobile telephony network. Traffic flows between the mobile units and the access point in the two opposite directions, the transmitted information in each direction generally including information, also called data, that comprise control messages and payload data. The control messages are primarily only transmitted between the mobile units 1 and the access point 3 to control the transmission of payload data, but the payload when sent to the access point is generally forwarded to some other unit, such as a different mobile unit or to a server in another network, not shown, e.g. the Internet, this forwarding for a mobile telephony network then passing a radio network controller 5 and possible other units and networks. The payload data transmitted to a mobile unit generally cause some specific action taken, except making transmissions, such as displaying a picture for which the received data include image data representing the picture or issuing sound e.g. music for which the received data include sound or audio data representing the sound.

Figure 3:
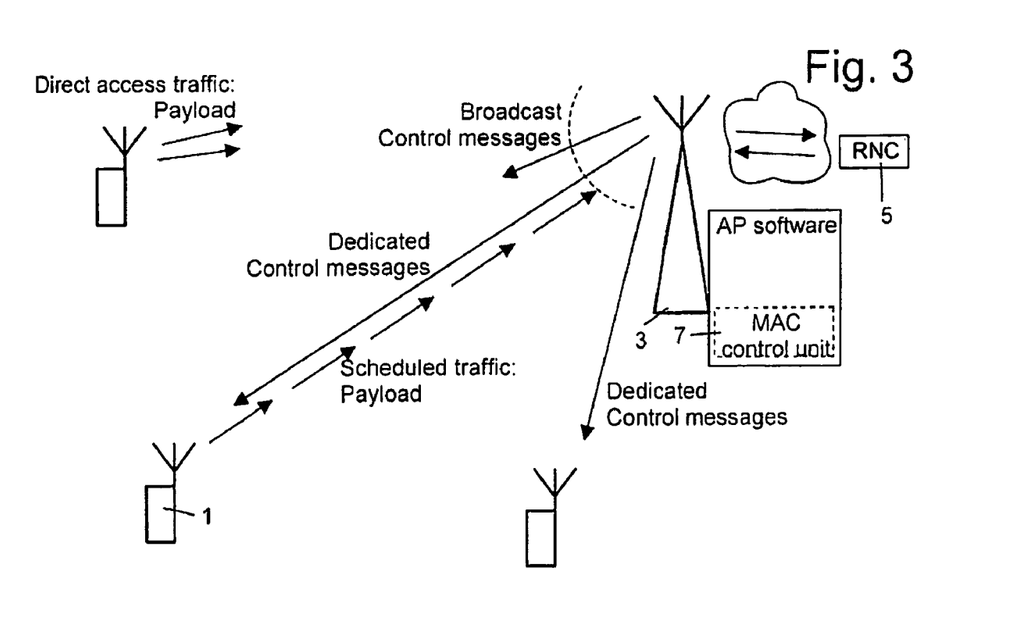
FIG. 3 is a schematic similar to FIG. 2 illustrating uplink transmission in the communication network.

Now the case will be considered in which the mobile units 1 desire to transmit data to the access point 3, this being a general uplink transmission case. For such transmissions the mobile units are supposed to all use the same shared medium, this being typically a single frequency, one or more time slots, a plurality of frequencies within a frequency band or a common set of codes or combinations thereof. As illustrated in FIG. 3, the transmissions from the mobile units 1 can be divided in two categories, a first category called scheduled (S) access or traffic transmitted according to a conflict-free protocol, thus in a conflict-free mode, and a second category called direct (D) access or traffic transmitted according to a contention-based protocol, thus in a contention-based mode.

For scheduled traffic the mobile unit 1 has been assigned some share, e.g. called an allocated resource, of the shared medium, the resource typically being a time slot, a set of frequencies or of codes. This assignment is given to the mobile unit 1 by a medium access control unit 7, that can be located in the access point 3, in the RNC 5, in some other node in the network or distributed among nodes, and is transported to the mobile unit in dedicated control messages sent from the access point to the mobile unit. The assignment can be given without time restrictions or be restricted to some time period, also defined in a control message. The assignment can also be cancelled by another control message. Such an assignment can be given the mobile unit e.g. after the access point first having received a message from the mobile unit requesting a transmission resource.

For direct access traffic the mobile units 1 try to transmit, generally in some portion of the shared medium, when they have something to transmit. If the transmission is not successful a mobile unit will try again until the transmission has been successfully completed. Information of the portion of the shared medium that is available for direct access traffic can e.g. be conveyed to the mobile units 1 in control messages broadcast from the access point or in dedicated control messages sent only to those of the mobile units which are allowed to transmit with direct access.

For some networks the payload data transmitted from a mobile unit can be different kinds, such as voice messages, image data, and then the transmission of the data for each of the kinds can be made in a different flow. The term user will in the following be used to be associated with only one such a flow, or to denote the mobile unit for networks in which no such flows exists but always not more than only a single transmission flow from each of the mobile units. Hence, a mobile unit can in the general case be considered to include more than one user.

The MAC control unit 7 determines at each instant the portion of the total shared medium which is open to be used for direct access transmissions. It also determines which of the users that will be allowed scheduled traffic and the resources, comprised in the rest of the shared medium, which are to be dedicated to each of those users. The determination of the portion allowed for direct access is primarily based on measured or estimated load in the uplink direction. Also, physical transmission conditions can be considered. The determination can also consider priorities that are assigned to the different users, each of the users then belonging to one of a plurality of priority classes.

In a specific example three priority classes, Gold, Silver and Bronze, mentioned in a decreasing priority order, are used for transmitting from the users. The priority classes can alternatively be given numbers such 1, 2 and 3 with priorities in a decreasing order.

In Table 1 is shows one example of how the users of the different priority classes are assigned the two access modes depending on traffic load for. In the table S+D means that the user can select either scheduled or direct access, e.g. for large and small amounts of data, respectively, or based on delay requirements. S means that the user is forced to use the scheduled mode. High priority users are thus allowed to use the direct access mode also for high traffic loads, whereas low priority users are forced into the scheduled mode already for low traffic loads. For each of the high priority users, this results in a lightly loaded contention-based transmission channel, having minimum delays, also for high total traffic loads. D means that the user is forced to use direct access.

TABLE 1

Example of access modes allowed for users of different priority classes and traffic loads.

| | Load | | | |
|---|---|---|---|---|
| Service class | Low | Medium | High | Very High |
| Bronze | S + D | S | S | S |
| Silver | S + D | S + D | S | S |
| Gold | S + D | S + D | S + D | S |

This method can be refined by introducing a softer forcing of low priority users to the scheduled access. This may be done by limiting the rate at which a user is allowed to transmit, i.e. by defining a maximum bitrate, the maximum transmission power, or the rate at which a user is allowed to try to transmit in the direct access mode, i.e. defining the minimum time period between successive tries to transmit. In Table 2 allowed access modes are listed that depend on traffic load and service classes for this case. The limited rate direct access mode is denoted by $D_{lim}$. The rate limit may be a continuous function of the traffic load, and is not restricted to fixed values and fixed traffic load limits as for simplicity is shown in Table 2. It can also be different for different priority classes.

TABLE 2

Example of access modes allowed for users of different priority classes with "soft modes".

| | Load | | | |
|---|---|---|---|---|
| Service class | Low | Medium | High | Very High |
| Bronze | S + D | S + $D_{lim}$ | S | S |
| Silver | S + D | S + D | S + $D_{lim}$ | S |
| Gold | S + D | S + D | S + D | S + $D_{lim}$ |

As appears from the discussion above, the tables apply also to data flows in the case where they are provided in the network, each data flow having a priority class, often determined directly from the type of data flow. Thus, in that case there may exist "high priority data flows", "low priority data flows", "transmission in a data flow", etc. High priority, delay sensitive data flows from a mobile unit can use direct access, whereas low priority data flows from the same mobile unit can use scheduled access.

Generally, there is no upper limit to the number of priority classes. A mobile terminal can have data to transmit that belong to several service classes, and access the shared medium accordingly for each type of data. The priority class assigned to a user can be determined based on e.g. the type of subscription that is valid for the mobile unit to which the user belongs and/or the type data that is transmitted. For instance, data flows are considered to belong to different service classes specific to the type of data transmitted in the data flow.

In the scheduled access mode the transmission can be made according to any known conflict-free principle, e.g. TDMA, FDMA, CDMA, token passing etc., or a combination thereof. In the same way, in the direct access mode the transmission can be made according to any suitable principle, including Aloha, CSMA, CSMA/CA, CSMA/CD etc., see e.g. R. Rom and M. Sidi, "Multiple Access Protocols", Springer-Verlag, 1990, ISBN 0-387-97253-6.

Also, each of the two access modes can be divided in two or more specific access modes. For example, the scheduled mode can in a 3G-network be divided in the WCDMA modes HS-DSCH and DCH (High Speed-Downlink Shared CHannel and Dedicated CHannel) in the downlink. In the uplink, DCH and E-DCH (Enhanced DCH) can be used The selection between the scheduled and direct access modes can for a user, for which both are allowed, be based on e.g. packet size or delay requirements. Since the scheduled access, if controlled by a scheduler, not shown, aware of radio quality, typically results in a higher "long term" bitrate, this access mode can be selected if long-term bitrate is prioritized over packet delay.

Example 1

An OFDMA Uplink

In a wireless network using Orthogonal Frequency Division Multiple Access (OFDMA) the method as described above can be used for the uplink. Using OFDMA, radio resource elements for the uplink can be created in the access point 3, such as in the setup of network or of the access point or by the MAC control unit 7. Such a radio resource element is a unique combination of a set of sub-carrier frequencies and time instants and all radio resource elements together form the total set of radio resource elements. The available radio resource elements must be known to both the MAC control unit and the mobile terminals. They can either be predetermined such as specified by a standard, or dynamically defined and signaled from the MAC control unit 7. Also, they can be given identifications, such as sequential order numbers, i.e. single numbers, or pair or triples of values or numbers representing frequency, time slot, code etc.

At each instant or in practice, at periodically repeated event times or in some cases when required, the following sequential steps can be executed, such as in the MAC control unit 7:

The total set of radio resource elements is divided into a subset of radio resource elements for direct access and a subset for scheduled access.

The priority classes for which users are allowed to use the direct access mode, if any, always include the highest priority class. If more than one priority class is determined for which users are allowed to use direct access, these priority classes always include the highest priority classes. Generally also, the number of priority classes for which users are allowed to use the direct access mode is set as large as possible, still maintaining low delays for users of the highest priority classes. For example, Silver users are only allowed to use direct access if it can be done without jeopardizing the delays of Gold users.

The division of the total set of radio resource elements between the access modes can be dynamic, and based e.g. on traffic load. For low traffic loads, all or a majority of the radio resource elements can be allocated to the direct access mode. For higher traffic loads more radio resource elements can be allocated to the scheduled mode that uses the available capacity better, while still maintaining sufficiently many radio resource elements for the direct mode for higher (Gold) priority users. Then the following step can be executed before the above two steps:

The current traffic load is determined or estimated.

Also information on the subsets for D and S access must be known to the mobile units 1. The subsets can be fixed and then be specified such as by a standard. In the case where they are dynamically defined they can be signaled from the MAC control unit 7, such as by using a number or numbers defining a boundary between the two subsets.

The currently allowed access modes can be broadcast from the access point 5 to the mobile terminals 1. Alternatively, only a value of the traffic load is broadcast, or, in another case, the traffic load is estimated by the mobile terminals themselves, and the allowed access modes are determined by the mobile terminals from a predefined rules stored in the mobile terminals, such as by performing a table-lookup in a table like Tables 1 and 2.

Figure 4:
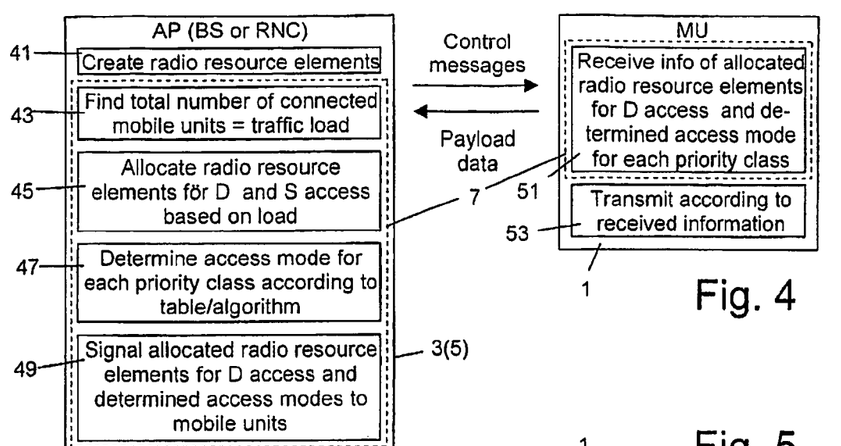
FIG. 4 is a schematic illustrating various units or modules in the mobile units and the access point required for efficient uplink transmission.
Figure 5:
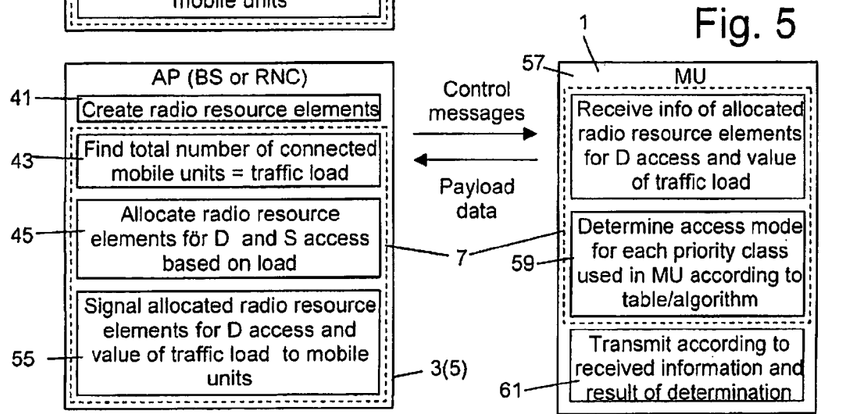
FIG. 5 is a schematic similar to FIG. 4 illustrating an alternative distribution of the units or modules between the mobile units and the access point.
Figure 6:
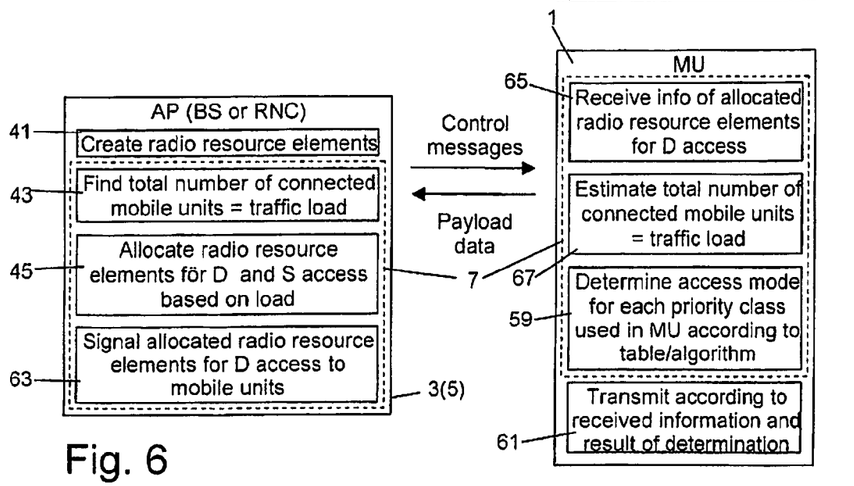
FIG. 6 is a schematic similar to FIG. 4 illustrating a further alternative distribution of the units or modules between the mobile units and the access point.

Some possible alternative cases of the transmission in the network are illustrated in FIGS. 4, 5 and 6. Thus, in FIG. 4 it is illustrated at 41 that in some way the radio resource elements are created. In the MAC control unit 7 that can be located and perform most of its functions in an access point 7 or partly elsewhere, such as in an RNC 5, except a receiving function in some cases, the total traffic load is periodically determined, see block 43. The total traffic load can be taken to be the total number of currently connected mobile terminals 1 or more exactly, the total number of currently connected users, i.e. the total number of radio resource elements already in use. Based on the traffic load and possibly also other conditions, such as e.g. the error rate in uplink transmissions, the MAC control unit determines in a block 45 the radio resource elements that are to be used for D and S access for new users. The subset of elements allowed for D access resulting from this determination can e.g. be represented by a set of a few numbers or values defining a boundary of this subset, in a simple case a number that e.g. is the upper boundary of the identification numbers of those radio resource elements which are allowed to use for D access. Then a table-lookup is made or it is calculated according to an algorithm how users that are not presently connected to transmit uplink, payload data, are to access the access point, see block 47. The result of the determinations in blocks 45 and 47. i.e. the allocation for D and S access and the allowed modes for the priority classes, are signaled, e.g. broadcast, in a block 49. The broadcast message is received by a mobile unit 1, see block 51, and when it has something to transmit, the transmission is made according to the information in the received message, see block 53.

In another case, illustrated by the schematic picture in FIG. 5, the MAC control unit 7, after having made the allocation for the D and S access, makes no determination of allowed access modes but instead broadcasts the allocation for D and S access and a value of the total load. The broadcast message is as above received by the mobile unit 1 in block 57, and when it has something to transmit, it determines in a block 59 how to make the access, e.g. in the same way as in block 47 for the case illustrated in FIG. 4. The transmission is then made according to the information in the received message as to the allocation and to the determination in block 59, see block 61.

Finally, in the case illustrated in FIG. 6, the MAC control unit 7, after having made the allocation for the D and S access, makes no determination of allowed access mode as in the case illustrated in FIG. 5, but instead broadcasts only the allocation for D and S access, see block 63. The broadcast message is received by the mobile unit 1 in a block 65, and when it has something to transmit, it estimates in a block 67 the total traffic load. Then, as for the case of FIG. 5, it determines in a block 59 how to make the access but now based on the estimation made in block 65. The transmission from the mobile unit is then made, as in the case illustrated in FIG. 5, according to the information in the received message as to the allocation and to the determination in the block 57, see block 61.

Example 2

WCDMA Enhanced Uplink

For a WCDMA network the allocation method as described herein can be used in an enhanced uplink (E-DCH) as specified by 3GPP, see "Medium Access Control (MAC) protocol specification", 3GPP TS 25.321, Release 6. The E-DCH supports, among other features, scheduling. A medium access layer in the base stations, called MAC-e, can control when and at which maximum data rate a mobile unit may transmit by sending scheduling grants to the mobile units. The MAC-e controls the transmission activity of a mobile unit using two downlink control channels, a shared absolute grant channel (E-AGCH) and a dedicated relative grant channel (E-RGCH). By sending the appropriate information on these channels, the scheduler in the MAC-e can rapidly control the transmission activity of individual mobile units. In addition, the radio network controller (RNC) can use higher layer signaling to control and configure the behavior of the mobile units on a slower basis. Finally, there is also a possibility to use uplink signaling to request resources, such a message e.g. called a scheduling request.

For low traffic loads, all mobile units can be allowed to transmit in the uplink up to the data rate indicated by the E-AGCH without a prior request phase, i.e. they can have contention based operation. At higher network loads, bronze users may be required to request resources prior to transmission, i.e. they are forced to used scheduled access, whereas gold users still can be allowed to use direct access to minimize the delays.

The switching between contention-based and conflict-free operation of a particular data flow in a mobile terminal, a particular mobile unit or terminal or a group of mobile units can be controlled by the base station by signaling on the E-AGCH if the appropriate signaling formats are used. It should be observed that the E-AGCH can address single users as well as groups of users belonging to certain priority classes. The E-AGCH signaling can also contain information on the data flows to which it is applicable, e.g. if the switch from contention-based access to conflict-free access is valid for all data flows, i.e. MAC-d flows, or only for the low priority flows. The signaling can also indicate whether the scheduling grant is applicable only to certain data flows, e.g. only to data flows having a priority higher than a possibly configurable threshold, or to all data flows in a mobile terminal. Thus, the scheduling of the transmissions from a mobile terminal can be performed so that at low traffic loads the mobile terminal is allowed to transmit data from all data flows, but for high traffic loads, as determined by the scheduler, not shown, in the base station, the scheduler has the possibility to send a grant valid only for data flows having a high priority. Thus, at high traffic loads, it is possible to throttle data flows having a low priority and to only allow data flows having a high priority. It can be observed that according to this procedure as all data flows can be taken to be operated in the "same mode", but with different priorities, e.g. low data rates are set for data flows having a low priority and high data rates are set for data flows having a high priority. E.g. some bits can be transmitted on the E-AGCH that indicate the priority class or the data flow for which the grant is applicable.

Alternatively, signaling from the RNC can be used to control the mode in which a mobile unit is operating, depending on the load, e.g. in particular the long-term load, in the cell and whether the user is a gold, silver or bronze user. Currently, as specified, there are two scheduling behaviors for the mobile units:

One mode which relies on uplink requests prior to receiving grants on the E-AGCH/E-RGCH.

The mobile unit is not allowed to transmit, except at a low minimum rate if configured, unless it has a valid scheduling grant. A grant is requested by uplink signaling.

Another mode in which the mobile unit is allowed to start transmitting autonomously without waiting for a valid scheduling grant. The mobile unit must continuously monitor the E-AGCH and follow any updates of the maximum rate.

For low loads, all users can be configured to use the second mode, i.e. direct access. At higher loads, gold users can still be allowed to use the second mode, whereas low priority such as bronze users are required to use the first mode. A mobile unit can as above comprise more than one user, i.e. it can have different configurations for different data flows, e.g. the second mode for delay sensitive data flows and the first mode for low priority data flows. The flows in this case corresponds to different MAC-d flows, or logical channels, as defined in the document cited above.

A third possibility is to configure a separate E-AGCH for each of the gold, silver and bronze category and let all users use the second mode. As the load increases, the data rates allowed for the bronze users can be reduced whereas relatively high data rates for gold users are still allowed.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of controlling access in a telecommunication network in which a communication medium is shared among a plurality of mobile units, and the mobile units utilize at least two access modes to access the communication medium, the at least two access modes including a direct access mode and a scheduled access mode, said method comprising the steps of:

associating different priorities with at least two communication types for transmissions from the mobile units, the different priorities including a high priority and a low priority;

determining, for each of the different priorities, which access mode to utilize for the associated communication type based on a traffic load in each of the at least two access modes; and, when a mobile unit has a transmission to make, accessing the shared communication medium by the mobile unit utilizing the access mode determined for the priority associated with the communication type to which the transmission belongs;

wherein the determining step comprises:

determining to utilize the direct access mode for traffic of a communication type having a high priority and a high traffic load; and determining to utilize the scheduled access mode for traffic of a communication type having a lower priority.

2. The method as recited in claim 1, wherein the step of determining which access mode to utilize for associated communication types is performed continuously, periodically, or at predetermined events.

3. The method as recited in claim 1, further comprising determining either an average calculated traffic load in the communication medium, or a value derived from traffic conditions, during a time period directly before and up to a current instant.

4. The method as recited in claim 1, further comprising after the determining step, informing the mobile units of the access mode determined for each of the different priorities.

5. The method as recited in claim 1, further comprising after the determining step, informing the mobile units of a total traffic load for the shared communication medium.

6. The method as recited in claim 1, further comprising before the determining step:

allocating a first portion of the shared communication medium for traffic from the mobile units using a first one of the at least two access modes; and allocating a second portion of the communication medium for traffic from the mobile units using a second one of the at least two access modes.

7. The method as recited in claim 6, wherein the allocating steps are performed continuously, periodically, or at predetermined events.

8. An access control unit for controlling an access mode utilized for transmissions from mobile units in a telecommunication network in which a communication medium is shared among a plurality of mobile units, and the mobile units utilize at least two access modes to access the communication medium, the at least two access modes including a direct access mode and a scheduled access mode, said access control unit operative to:
- associate different priorities with at least two communication types for transmissions from the mobile units, the different priorities including a high priority and a low priority;
- determine a total traffic load or a traffic load in each of the access modes;
- determine, for each of the different priorities, which access mode to utilize for the associated communication type based on said traffic load, wherein:
  - the direct access mode is used for traffic of a communication type having a high priority and a high traffic load; and,
  - the scheduled access mode is used for traffic of a communication type having a lower priority; and,
- inform the mobile units of the access mode determined for each of the different priorities.

9. The access control unit as recited in claim 8, wherein the access mode to utilize for associated communication types is determined continuously, periodically, or at predetermined events.

10. The access control unit as recited in claim 8, wherein said traffic load is either an average calculated traffic load in the communication medium or a value derived from traffic conditions during a time period directly before and up to a current instant.

11. The access control unit as recited in claim 8, wherein the direct access mode is utilized for traffic of a communication type having a high priority and a high traffic load, and the scheduled access mode is utilized for traffic of a communication type having a lower priority.

12. The access control unit as recited in claim 8, said access control unit further operative to allocate a first portion of the communication medium to traffic from the mobile units using a first one of the at least two access modes and a second portion of the traffic from the mobile units using a second one of the at least two access modes.

13. The access control unit as recited in claim 8, wherein the access control unit is implemented in a radio base station or other network node.

14. The access control unit as recited in claim 8, wherein the access control unit is implemented in each of the mobile units.

15. A mobile unit for use in a telecommunication network in which a communication medium is shared among a plurality of mobile units, the mobile unit comprising:
- transmission means for utilizing at least two access modes to transmit to the communication medium at least two communication types having different priorities, wherein the at least two access modes include a direct access mode and a scheduled access mode, and the different priorities include a high priority and a low priority; and,
- an access control unit in communication with the transmission means, the control unit comprising:
  - means for associating different priorities with the communication types;
  - mode determining means for determining, for each of the different priorities, which access mode to utilize for the associated communication type based on a traffic load in said shared communication medium wherein:
    - the direct access mode is used for traffic of a communication type having a high priority and a high traffic load; and,
    - the scheduled access mode is used for traffic of a communication type having a lower priority.

16. The mobile unit as recited in claim 15, wherein said mode determining means comprises a load receiving unit for receiving information on traffic conditions in the shared communication medium, wherein the mode determining means determines the access mode to utilize based on the received information on the traffic conditions.

17. The mobile unit as recited in claim 15, wherein the mode determining means includes a load estimation unit for estimating traffic conditions in the shared communication medium, wherein the mode determining means determines the access mode to utilize based on the estimated traffic conditions.

* * * * *